United States Patent
Song et al.

(10) Patent No.: US 12,304,411 B2
(45) Date of Patent: May 20, 2025

(54) AIRBAG DEVICE AND METHOD FOR CONTROLLING DEPLOYMENT

(71) Applicant: HYUNDAI MOBIS CO., LTD., Seoul (KR)

(72) Inventors: Jiwoon Song, Yongin-si (KR); Dong Gil Lee, Yongin-si (KR); Sang Won Hwangbo, Yongin-si (KR); Byung Ho Min, Yongin-si (KR); Jae Jun Harm, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 215 days.

(21) Appl. No.: 18/081,250

(22) Filed: Dec. 14, 2022

(65) Prior Publication Data
US 2024/0092298 A1 Mar. 21, 2024

(30) Foreign Application Priority Data
Sep. 21, 2022 (KR) .................. 10-2022-0119459

(51) Int. Cl.
*B60R 21/01* (2006.01)
*B60N 2/00* (2006.01)
*B60R 21/2338* (2011.01)

(52) U.S. Cl.
CPC .............. *B60R 21/01* (2013.01); *B60N 2/002* (2013.01); *B60R 2021/01225* (2013.01); *B60R 2021/01245* (2013.01); *B60R 2021/23386* (2013.01)

(58) Field of Classification Search
CPC .......... B60R 21/01; B60R 21/207; B60R 2021/01225; B60R 2021/01245; B60R 2021/23386; B60N 2/002
See application file for complete search history.

(56) References Cited

U.S. PATENT DOCUMENTS 10,703,319 B2 * 7/2020 Schneider ............. B60R 21/207
10,821,928 B2 * 11/2020 Deng ................. B60R 21/23138
(Continued)

FOREIGN PATENT DOCUMENTS

DE 102014117882 A1 4/2016
JP 2006-088902 A 4/2006
(Continued)

OTHER PUBLICATIONS

Office Action issued Mar. 29, 2024, in corresponding Korean Patent Application No. 10-2022-0119459 (6 pages).
(Continued)

*Primary Examiner* — George C Jin
(74) *Attorney, Agent, or Firm* — NovoTechIP International PLLC

(57) ABSTRACT

An airbag device and a method for controlling deployment of the same are proposed. The airbag device is configured to protect a passenger by controlling an airbag cushion deployed toward the rear space of a seatback in an event of a vehicle collision, and the airbag device includes an airbag cushion deploying toward the rear space of the seatback, a sensor part detecting a seating status and a seating posture of a passenger with respect to each seat, and a controller, in an event of a collision, configured to change and control a deploying status of the airbag cushion and an inflation amount of the airbag cushion in response to the seating status and the seating posture of the passenger.

10 Claims, 4 Drawing Sheets

(56) References Cited

U.S. PATENT DOCUMENTS

| | | | |
|---|---|---|---|
| 10,882,487 B2 | 1/2021 | White et al. | |
| 10,981,529 B2* | 4/2021 | Kim | B60N 2/42709 |
| 11,267,427 B1* | 3/2022 | Deng | B60R 21/207 |
| 11,618,404 B1* | 4/2023 | Jaradi | B60R 21/23138 |
| | | | 280/730.1 |
| 2018/0319358 A1* | 11/2018 | Schneider | B60R 21/233 |
| 2019/0111880 A1* | 4/2019 | Choi | B60R 21/013 |
| 2021/0170983 A1* | 6/2021 | Shin | B60R 21/207 |

FOREIGN PATENT DOCUMENTS

| | | | |
|---|---|---|---|
| JP | 2020062960 A | 4/2020 | |
| KR | 20160042198 A | 4/2016 | |
| KR | 20190042202 A | 4/2019 | |

OTHER PUBLICATIONS

Office Action issued on May 5, 2023 in regard to the corresponding German patent application No. 102022132378.1.

Notice of Allowance issued on Dec. 5, 2024 in regard to the corresponding Korean patent application No. 10-2022-0119459.

\* cited by examiner

AIRBAG DEVICE AND METHOD FOR CONTROLLING DEPLOYMENT

CROSS-REFERENCE TO RELATED APPLICATIONS

The present application claims priority to Korean Patent Application No. 10-2022-0119459, filed Sep. 21, 2022, the disclosure of which is incorporated herein for all purposes by this reference.

TECHNICAL FIELD

The present disclosure relates generally to an airbag device and a method for controlling deployment of the same, the airbag device being configured to protect a passenger by controlling operation of an airbag cushion deployed toward the rear space of a seatback in an event of a vehicle collision.

BACKGROUND

In an autonomous driving stage above a certain level, a situation in which a vehicle is self-driven may occur without a driver directly driving the vehicle.

When driving is performed by the vehicle, a wider rest space may be required in the vehicle room for a comfortable rest for passengers.

For example, in order to secure the space for the passengers, a steering wheel may be significantly pushed in a direction toward a cockpit to be stored, or a driver's seat may be moved rearward to increase the space in the driver seat.

Specifically, the seat posture may be variously changed such that a seat is operated in a swiveling manner and a passenger sits in the seat while facing the rear space and travels with the posture of facing a passenger in a rear row seat.

However, when a passenger in a first-row seat in with the first-row seat arranged in a look-behind mode while facing the rear space and a front collision occurs, the seatback of the first-row seat is leaned rearward and there is a problem in that a seatback and a crash pad crash into each other causing injuries to the passenger.

In addition, when passengers sit in the first-row seat and the second-row seat normally arranged in the look-forward mode and a front collision occurs, there is a problem in that the passenger in the second-row seat crashes into the seatback of the first-row seat and is injured.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose an airbag device and a method for controlling deployment of the same, wherein the airbag device is configured to protect a passenger by controlling operation of an airbag cushion deployed toward the rear space of a seatback in an event of a vehicle collision.

In order to achieve the above objective, an airbag device of the present disclosure includes: an airbag cushion configured to be deployed toward a rear space of a seatback; a sensor part configured to detect a seating status and a seating posture of a passenger with respect to each seat; and a controller, in an event of a collision, configured to adjust, change and control deployment (i.e., deployment status, mode, etc.) of the airbag cushion and an inflation amount of the airbag cushion in response to the seating status and the seating posture of the passenger.

The airbag device may include: a tether connected to the airbag cushion and configured to restrain a deployment shape of the airbag cushion in a longitudinal direction; and a tether release device configured to selectively release-operate the tether in response to a signal transmitted from the controller, and to expand and inflate the airbag cushion in a connection direction in which the tether is released.

When the passenger sits in a first-row seat while facing the rear space and a front or rear collision occurs, the controller may deploy the airbag cushion of the first-row seat without operating the tether release device.

The controller may be configured to deploy the airbag cushion at low pressure.

When a front row seat faces a front space and the passenger sits in a rear row seat while facing the front space and a front collision or a rear collision occurs, the controller may operate the tether release device and expands and deploy the airbag cushion of the front row seat.

The controller may be configured to deploy the airbag cushion at high pressure.

The controller may be configured to expand and deploy the airbag cushion of the front row seat regardless of existence of a passenger sitting in the front row seat.

A method for controlling deployment of the airbag device of the present disclosure may include: detecting, by a sensor part, a seating status and a seating posture of a passenger with respect to each seat; and controlling, by a controller, in an event of a collision of a vehicle, a deploying status and an inflation amount of an airbag cushion configured to be deployed toward a rear space of a seatback in response to the seating status and the seating posture of the passenger.

As described above, the present disclosure is configured to adjust in response to the seating information of the passenger sitting in the seat a longitudinal length of the airbag cushion deployed toward the rear space of the seatback, or even in a collision situation, when there is no need for the airbag cushion to be deployed, the present disclosure controls the airbag cushion so that the airbag cushion is not deployed.

Therefore, as the airbag cushion is deployed to be suitable for the seating condition of the passenger, the passenger is safely protected, and meanwhile, unnecessary deployment operation of the airbag cushion is limited.

DETAILED DESCRIPTION

Figure 1:
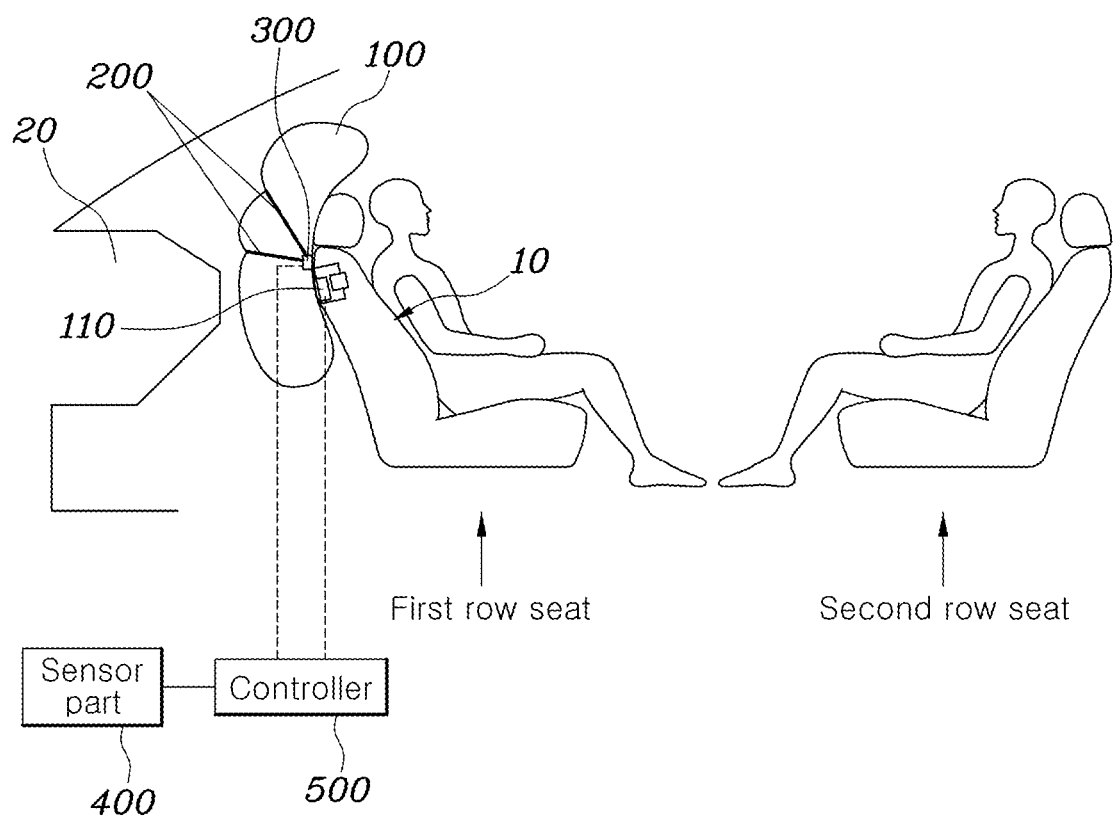
FIG. 1 is a view showing deployment operation of an airbag cushion according to the present disclosure when a front collision occurs in a look-behind mode of a first-row seat.

Hereinbelow, a preferred embodiment described in the specification will be described in detail with reference to accompanying drawings, and regardless of the reference numerals, the same reference numerals will refer to the same or like parts, and redundant descriptions thereof will be omitted.

The suffixes "module and "part" for the components used in the following description are given or mixed in consideration of only the ease of writing the specification, and do not have distinct meanings or roles by themselves.

In the following description, if it is decided that the detailed description of known function or configuration related to the disclosure makes the subject matter of the disclosure unclear, the detailed description is omitted. Furthermore, the accompanying drawings are only for understanding of the preferred embodiments of the present disclosure, and the technical ideas disclosed in the specification are not limited by the accompanying drawings, and those skilled in the art will appreciate that various modifications, additions and substitutions are possible, without departing from the scope and spirit of the disclosure as disclosed in the accompanying claims.

It will be understood that, although the terms first and/or second, etc. may be used herein to describe various elements, these elements should not be limited by these terms. These terms are only used to distinguish one element from another element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise" or "have" used in this specification, specify the presence of stated features, steps, operations, components, parts, or a combination thereof, but do not preclude the presence or addition of one or more other features, numerals, steps, operations, components, parts, or a combination thereof.

The controller may include a communication device communicating with other controllers or a sensor to control the function in charge, a memory storing an operation system or a logic command and input/output information, and at least one process performing determination, calculation, and decision necessary for controlling the function in charge.

Figure 2:
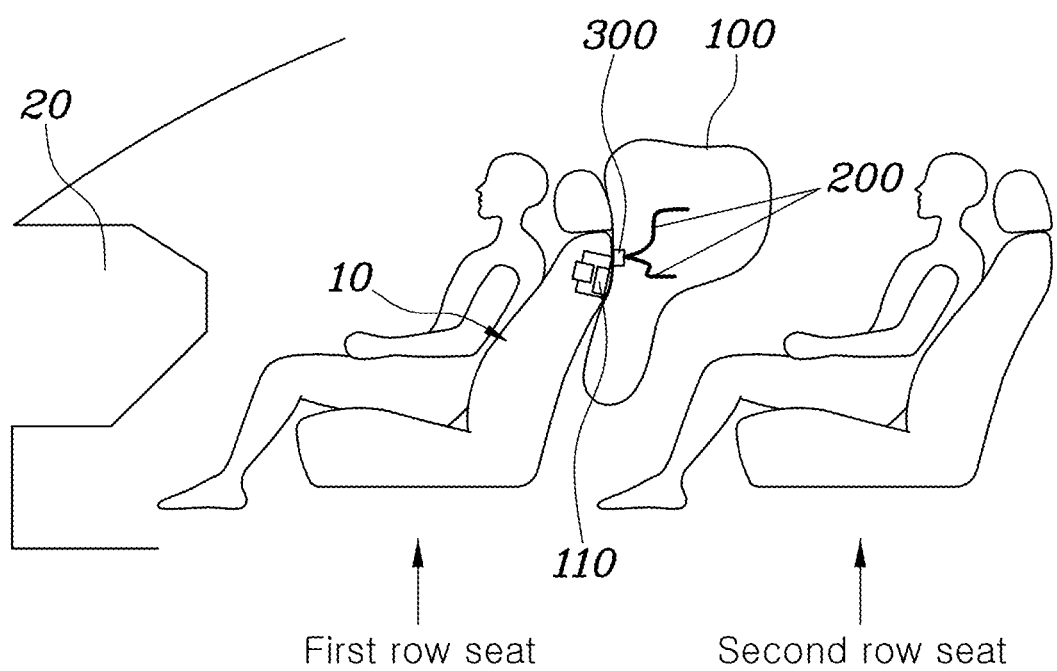
FIG. 2 is a view showing deployment operation of the airbag cushion according to the present disclosure when a front collision occurs in a look-forward mode of the first-row seat.

FIG. 1 is a view showing deployment operation of an airbag cushion 100 according to the present disclosure when a front collision occurs in a look-behind mode of a first-row seat. FIG. 2 is a view showing deployment operation of the airbag cushion 100 according to the present disclosure when a front collision occurs in a look-forward mode of the first-row seat.

Referring to the drawings, an airbag device of the present disclosure includes: the airbag cushion 100 deployed toward the rear space of the seatback 10; a sensor part 400 detecting a seating status and a seating posture of a passenger with respect to each seat; a controller 500, in an event of a collision, in response to the seating status and the seating posture of the passenger, changing and controlling a deploying status of the airbag cushion 100 and an inflation amount of the airbag cushion 100.

For example, the sensor part 400 may be a photographing means such as a camera, etc., and at least one sensor part is installed in a vehicle room to detect whether or not a passenger sits in a seat and to detect a condition of the passenger sitting in the seat.

In addition, the airbag cushion 100 is installed at the seatback 10, and the airbag cushion 100 inflates and is deployed toward the rear space of the seatback 10 to reduce a collision force crashing a rear portion of the seatback 10.

Furthermore, an inflator 110 is connected to the airbag cushion 100 and gas exploded from the inflator 110 is supplied into the airbag cushion 100 so that the airbag cushion 100 inflates and is deployed.

In addition, the controller 500 analyses images of the passenger detected by the sensor part 400 to determine the seating information of the passenger.

For example, when the first-row seat and a second-row seat are provided, the sensor part 400 recognizes a passenger sitting in each seat and a direction of each seat, and transmits the recognized seating information to the controller 500. For example, the controller 500 may be an airbag control unit (ACU) controlling operation of an airbag.

Therefore, when a vehicle collision occurs, in response to the seating information determined by the controller 500, the airbag cushion 100 inflates toward the rear space of the seatback 10 while the length of the airbag cushion 100 is adjusted, or when there is no need to deploy the airbag cushion 100 even in a collision situation, the controller 500 controls the airbag cushion 100 so that the airbag cushion 100 is not deployed.

Therefore, as the airbag cushion 100 is deployed to be suitable for the seating condition of the passenger, the passenger is safely protected, and meanwhile, unnecessary deployment operation of the airbag cushion 100 is limited.

In addition, the present disclosure includes: the tether 200 connected to the airbag cushion 100 to restrain a deployment shape of the airbag cushion in a longitudinal direction thereof; and a tether release device 300 release-operating the tether 200 selectively in response to a signal transmitting from the controller 500, and expanding and inflating the airbag cushion 100 in a connection direction in which the tether 200 is released.

Specifically, the tether 200 is connected to the inside portion of the airbag cushion 100 in the longitudinal direction.

The first end of the tether 200 is connected to the tether release device 300, and a second end thereof is fixed to an inner surface of the airbag cushion 100, i.e., to an inner surface of a rear end of the airbag cushion 100.

In addition, the controller 500 determines whether or not the tether 200 is released, on the basis of the seating information of the passenger.

Therefore, in an event of a vehicle collision, when the controller 500 determines that releasing of the tether 200 is necessary, as the controller 500 applies an operation signal to the tether release device 300, the tether release device 300 cuts off or releases the tether 200, so that connection of the tether 200 is released.

Then, as the tether 200 connected to the airbag cushion 100 in the longitudinal direction thereof is released, the inflation amount of the airbag cushion 100 in the longitudinal direction increases and thus a longitudinal length of the airbag cushion 100 extends and is deployed.

Meanwhile, referring to FIG. 1, according to the present disclosure, when the passenger sits in the first-row seat while facing the rear space and a front or rear collision occurs, the controller 500 may deploy the airbag cushion 100 of the first-row seat without operating the tether release device 300.

For example, when the passenger sits in the first-row seat facing a crash pad 20 while facing the rear space and a collision occurs in the front of the vehicle, the controller deploys the airbag cushion 100 without operating the tether release device 300.

Here, since the tether 200 is not released, the airbag cushion is deployed such that the longitudinal length of the airbag cushion 100 is relatively shorter and smaller than the longitudinal length of the airbag cushion 100 with the released tether 200.

Therefore, as the airbag cushion 100 is deployed between the crash pad 20 that is an interior portion and a first-row seatback 10, the airbag cushion 100 absorbs a weight of the first-row seatback 10 directed to the crash pad 20 and thus an injury risk caused when the passenger sitting in the first-row seat crashes into the crash pad 20 is prevented.

Moreover, the controller 500 controls the airbag cushion 100 so that the airbag cushion 100 is deployed at low pressure.

To this end, the inflator 110 supplying gas into the airbag cushion 100 may include both of a high-pressure or low-pressure type, or may be designed to dualize a pressure of the gas exploding from the inflator 110 into low pressure or high pressure.

Here, as the airbag cushion 100 is deployed at low pressure by controlling the inflator 110, a deployment speed of the airbag cushion 100 is relatively lowered, and an impact that may be generated when the airbag cushion 100 crashes into the crash pad 20 in the deployment process of the airbag cushion 100 is reduced.

In addition, as shown in FIG. 2, according to the present disclosure, when the front row seat is arranged to face the front space and the passenger sitting in the rear row seat while facing the front space and a front or rear collision occurs, the controller 500 may expand and deploy the airbag cushion 100 of the front row seat while operating the tether release device 300.

For example, when a passenger sits in the first-row seat while facing the front space and a passenger in the second-row seat sits while facing the front space and a collision occurs at the vehicle front portion, the tether release device 300 installed at the first-row seat is operated to deploy the airbag cushion 100 of the first-row seat.

Therefore, as the tether 200 is released, the longitudinal length of the airbag cushion 100 is relatively longer and larger than the longitudinal length of the airbag cushion 100 with the unreleased tether 200.

Therefore, the passenger sitting in the second-row seat is cushioned on the airbag cushion 100 and a passenger seated at the second row is protected.

Moreover, the controller 500 may deploy the airbag cushion 100 at high pressure.

In other words, as the airbag cushion 100 is deployed at high pressure by controlling the inflator 110, a deployment speed of the airbag cushion 100 is relatively faster, and the airbag cushion 100 is quickly deployed toward the passenger sitting in the second-row seat, so that the airbag cushion 100 cushions the passenger in the second-row seat quickly and protects.

In addition, the controller 500 may expand and deploy the airbag cushion 100 of the front row seat regardless of whether or not the passenger sits in the front row seat.

Figure 3:
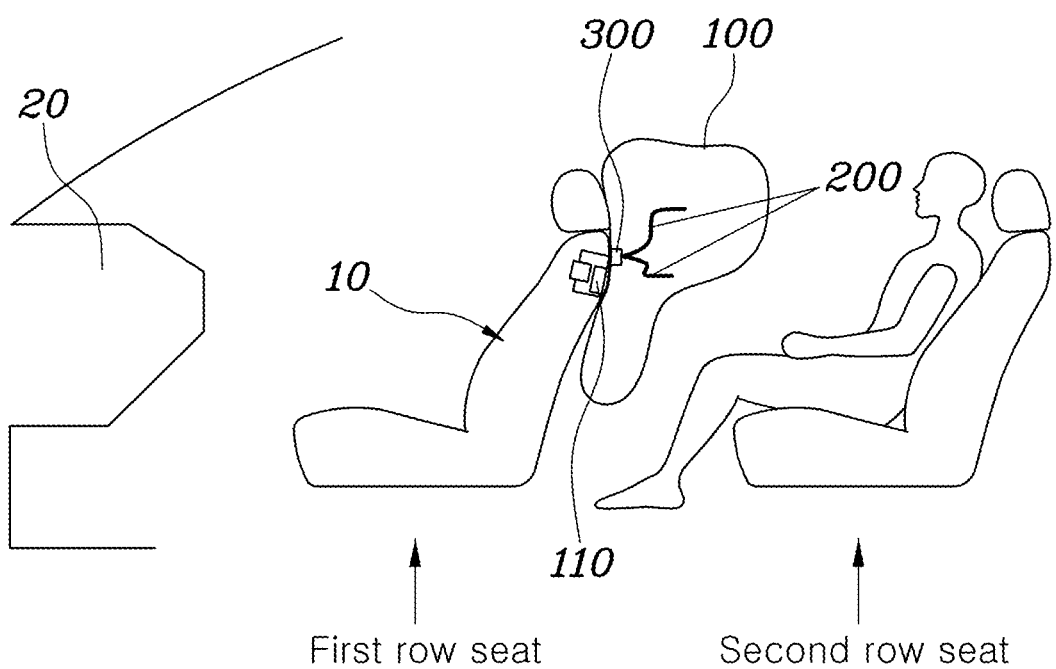
FIG. 3 is a view showing deployment operation of the airbag cushion according to the present disclosure when a front collision occurs while no passenger sits in the first-row seat.

FIG. 3 is a view showing deployment operation of the airbag cushion 100 according to the present disclosure when a front collision occurs while no passenger sits in the first-row seat.

Referring to FIG. 3, when a collision occurs at the front portion of the vehicle while no passenger sits in the first-row seat facing the front space and a passenger sits in the second-row seat facing the front space, the tether release device 300 installed in the first-row seat is operated to deploy the airbag cushion 100 of the first-row seat.

Therefore, as the tether 200 is released, the longitudinal length of the airbag cushion 100 is relatively longer and larger than the longitudinal length of the airbag cushion 100 with the unreleased tether 200.

In other words, in addition to a passenger sits in the first-row seat, even when no passenger sits in the first-row seat, the airbag cushion 100 provided in the first-row seat is deployed so that the passenger sitting in the second-row seat is protected by being cushioned on the airbag cushion 100.

Meanwhile, a method for controlling deployment of the airbag device of the present disclosure includes: detecting, by the sensor part 400, a seating status and a seating posture of a passenger with respect to each seat; and controlling, by the controller 500, in an event of a vehicle collision, a deploying status and an inflation amount of the airbag cushion 100 of the seatback 10 deployed toward the rear space in response to the seating status and the seating posture of the passenger.

Figure 4:
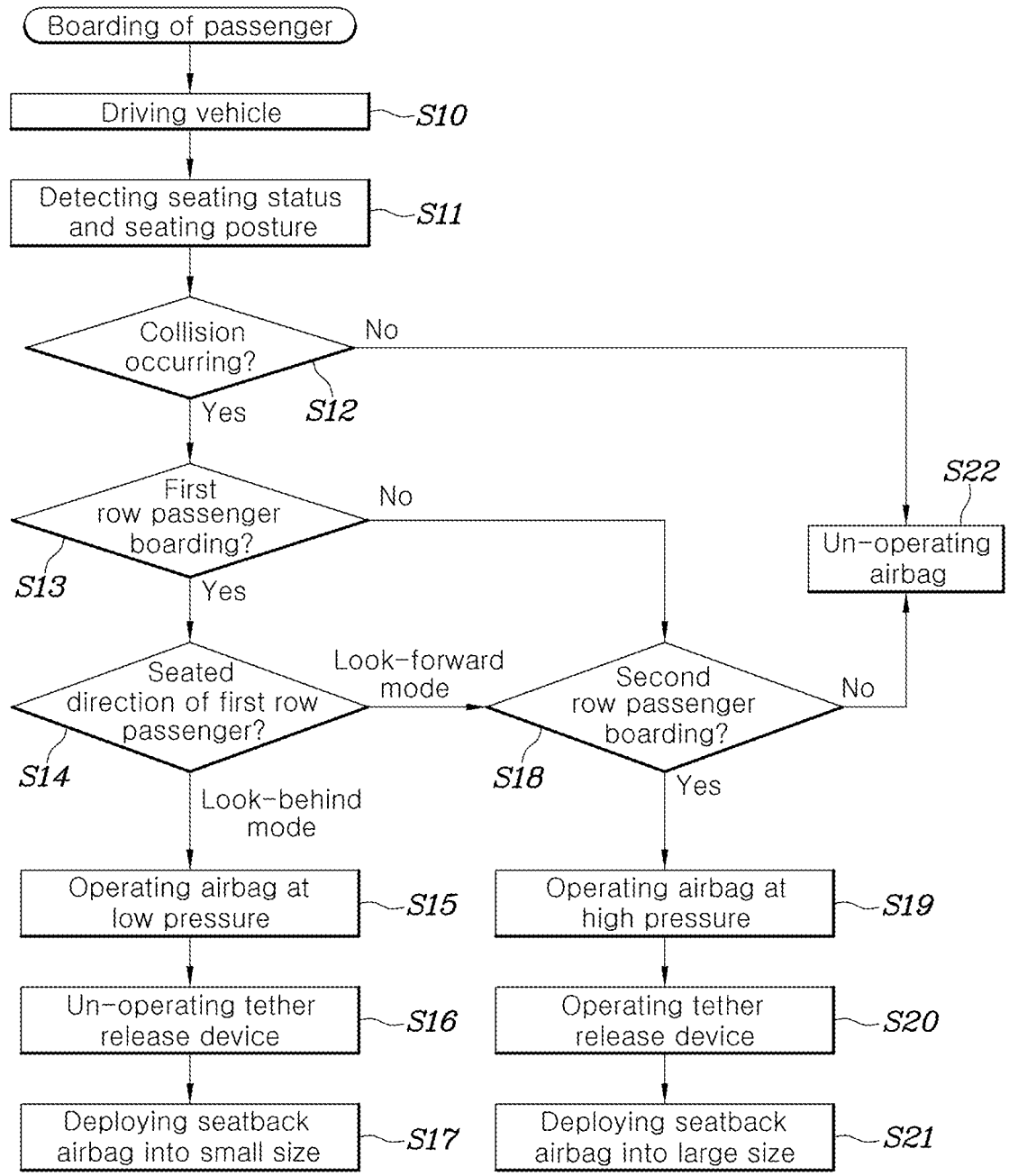
FIG. 4 is a flowchart of a control process of deployment of the airbag cushion according to the present disclosure.

FIG. 4 is a flowchart of a control process of deployment of the airbag cushion 100 according to the present disclosure.

Referring to the drawing, describing the deployment process of the airbag cushion 100, in a process of the passenger boarding and driving the vehicle, a seating status and a seating posture of the passenger is detected by a signal detected by the sensor part 400 at S10 and S11.

Then, whether or not a collision occurs in the vehicle driving process is monitored at S12.

When a front collision of the vehicle occurs in the monitoring process, the signal detected by the sensor part 400 is analyzed to determine whether or not a passenger sits in the first-row seat at S13.

As a result of the determination at S13, when it is determined that the passenger sits in the first-row seat, a seated direction of the passenger in the first-row seat is determined at S14.

As a result of the determination at S14, when the passenger in the first-row seat sits in a look-behind mode, the airbag cushion 100 is deployed at low pressure at S15.

In addition, the tether release device 300 installed in the airbag device of the first-row seat is controlled not to be operated at S16.

Therefore, as the tether 200 is not released and the airbag cushion 100 of the first-row seat is deployed into a small size, the airbag cushion 100 absorbs the weight of the first-row seatback 10 toward the crash pad 20 so that a risk of injuries to the passenger sitting in the first-row seat when crashing into the crash pad 20 is prevented at S17.

Meanwhile, as a result of the determination at S14, when the passenger in the first-row seat sits in a look-forward mode, whether or not a passenger sits in the second-row seat is determined at S18.

As a result of the determination at S18, when it is determined that a passenger sits in the second-row seat, the airbag cushion 100 of the airbag device installed in the first-row seat is deployed at high pressure at S19.

In addition, the tether release device 300 installed in the airbag device is controlled to be operated at S20.

Therefore, as the tether 200 is released and the airbag cushion 100 of the first-row seat is inflated, the airbag cushion 100 cushions the passenger sitting in the second-row seat and protects the passenger at S21.

Meanwhile, as a result of the determination at S13, when it is determined that no passenger sits in the first-row seat, whether or not a passenger sits in the second-row seat is determined at S18.

As a result of the determination at S18, when a passenger sits in the second-row seat, the controller enters S19, the airbag cushion 100 of the airbag device installed in the first-row seat is deployed at high pressure, thereby protecting the passenger in the second-row seat.

On the other hand, as a result of the determination at S18, when no passenger sits in the second-row seat, there is no need for the airbag cushion 100 installed in the first-row seatback 10 to be deployed, and the airbag cushion 100 is controlled not to be deployed at S22.

As described above, according to the present disclosure, in an event of a vehicle collision, the airbag cushion 100 is inflated while being changed in a longitudinal length thereof in response to a seating status and a seated posture of a passenger.

Therefore, the airbag cushion 100 is deployed suitable for the seating information of the passenger, and protects the passenger more securely.

Although the preferred embodiments of the present disclosure have been disclosed in detail only with respect to the above specific embodiments, those skilled in the art will appreciate that various modifications, additions, and substitutions are possible, without departing from the spirit and scope of the present disclosure, and it is appropriate that the various modifications, additions, and substitutions belong to the accompanying claims.

What is claimed is:

1. An airbag device for a vehicle having a first-row seat and a second-row seat, the airbag device comprising:
    an airbag cushion disposed at a seatback of the first-row seat and configured, when inflated, to deploy from the seatback toward a rear space of the seatback;
    a sensor configured to detect a seating status and a seating posture of a passenger seated at one of the first-row seat and the second-row seat; and
    a controller configured, in response to an occurrence of a vehicle collision, to adjust deployment and an inflation amount of the airbag cushion based on the detected seating status and seating posture of the passenger,
    wherein the controller is configured, in response to the occurrence of the vehicle collision, to control the airbag cushion to be deployed selectively at a first or second pressure based on the detected seating status and seating posture of the passenger, the second pressure being greater than the first pressure, and
    wherein, in response to the detected seating status and seating posture of the passenger indicating that the passenger is seated at the second-row seat and facing in a forward direction of the vehicle, the controller is configured, in response to the occurrence of the vehicle collision, to control the airbag cushion to be deployed regardless of whether another passenger is seated at the first-row seat.

2. The airbag device of claim 1, further comprising:
    a tether connected to the airbag cushion and configured to restrain a deployment shape of the airbag cushion; and
    a tether release device configured to:
        selectively release the tether when a signal to release the tether is received from the controller, and
        inflate the airbag cushion in a connection direction in which the tether is released.

3. The airbag device of claim 1, wherein, in response to the detected seating status and seating posture of the passenger indicating that the passenger is seated at the first-row seat and facing in a rearward direction of the vehicle, the controller is configured to control the airbag cushion to be deployed at the first pressure.

4. The airbag device of claim 1, wherein, in response to the detected seating status and seating posture of the passenger indicating that (1) the first-row seat faces in a forward direction of the vehicle and (2) the passenger is seated at the second-row seat and facing in the forward direction of the vehicle, the controller is configured, in response to the occurrence of the vehicle collision, to control the airbag cushion to be deployed at the second pressure.

5. The airbag device of claim 2, wherein, in response to the detected seating status and seating posture of the passenger indicating that (1) the first-row seat faces in a forward direction of the vehicle and (2) the passenger is seated at the second-row seat and facing in the forward direction of the vehicle, the controller is further configured, in response to the occurrence of the vehicle collision, to transmit, to the tether release device, the signal to release the tether.

6. A method for controlling deployment of an airbag device for a vehicle, the vehicle comprising (1) a first-row seat having a seatback, (2) a second-row seat, and (3) an airbag cushion disposed at the seatback and configured, when inflated, to deploy from the seatback toward a rear space of the seatback, the method comprising:
    detecting a seating status and a seating posture of a passenger seated at the first-row or second-row seat; and
    in response to an occurrence of a vehicle collision, adjusting, based on the detected seating status and seating posture of the passenger, deployment and an inflation amount of the airbag cushion,
    wherein adjusting the deployment and the inflation amount of the airbag comprises controlling the airbag cushion to be deployed selectively at a first or second pressure based on the detected seating status and seating posture of the passenger, the second pressure being greater than the first pressure, and
    wherein the method further comprises, in response to the detected seating status and seating posture of the passenger indicating that the passenger is seated at the second-row seat and facing in a forward direction of the vehicle, controlling the airbag cushion to be deployed regardless of whether another passenger is seated at the first-row seat.

7. The method of claim 6, wherein:
    the vehicle further comprises a tether connected to the airbag cushion and configured to restrain a deployment shape of the airbag cushion, and
    the method further comprises, in response to the occurrence of the vehicle collision, based on the detected seating status and seating posture of the passenger, selectively releasing the tether and deploying the airbag cushion in a connection direction in which the tether is released.

8. The method of claim 6, wherein controlling the airbag cushion to be deployed at the first or second pressure comprises controlling the airbag cushion to be deployed at the first pressure in response to the detected seating status and seating posture of the passenger indicating that the passenger is seated at the first-row seat and facing in a rearward direction of the vehicle.

9. The method of claim 6, wherein controlling the airbag cushion to be deployed at the first or second pressure comprises controlling the airbag cushion to be deployed at the second pressure in response to the detected seating status and seating posture of the passenger indicating that the first-row seat faces in a forward direction of the vehicle and the passenger is seated at the second-row seat and facing in the forward direction of the vehicle.

10. The method of claim 7, wherein selectively releasing the tether comprises releasing the tether in response to the detected seating status and seating posture of the passenger indicating that the first-row seat faces in a forward direction of the vehicle and the passenger is seated at the second-row seat and facing in the forward direction of the vehicle.

\* \* \* \* \*